United States Patent [19]

Fenton

[11] Patent Number: 5,356,058
[45] Date of Patent: Oct. 18, 1994

[54] BICYCLE SEAT BAG

[75] Inventor: Timothy J. Fenton, New Canaan, Conn.

[73] Assignee: Cannondale Corporation, Georgetown, Conn.

[21] Appl. No.: 31,525

[22] Filed: Mar. 15, 1993

[51] Int. Cl.⁵ ............................................. B62J 9/00
[52] U.S. Cl. ................................. 224/32 R; 224/275
[58] Field of Search .................... 224/32 R, 30 R, 34, 224/39, 33 R, 273, 275, 32 A, 36, 35; 206/38, 234; 220/306, 480, 482, 751

[56] References Cited

U.S. PATENT DOCUMENTS

| D. 185,830 | 8/1959 | Schreckengost | 224/35 X |
| 4,643,343 | 2/1987 | Goldman et al. | 224/32 R X |
| 5,024,359 | 6/1991 | Thomas | 224/36 |
| 5,127,563 | 7/1992 | Chan et al. | 224/32 R X |
| 5,170,658 | 12/1992 | Thayer | 224/30 R X |

OTHER PUBLICATIONS

Brochure of Armadillo Bicycle Products (2 pages) no date.

Primary Examiner—Glenn T. Barrett
Attorney, Agent, or Firm—Brumbaugh, Graves, Donohue & Raymond

[57] ABSTRACT

A bicycle seat bag comprises a tapered unitary body formed of a substantially rigid polymeric material and having a smaller forward end and a larger rearward end, an opening at the rearward end of the body, and a unitary cap member formed of a substantially rigid polymeric material detachably connected to the body at the opening. A cleat member attached to the top of the body has a pair of slots opening outwardly in opposite directions that receive the frame bars of a bicycle seat to removably attach the body to the seat. A generally C-shaped clip member attached to the forward end of the body and having a pair of resilient legs defining an opening that faces laterally is received on and resiliently engaged with a bicycle seat post with one leg in front of and the other leg in back of the seat post so as to attach the body to the seat post against forward, backward and rotational movements.

17 Claims, 4 Drawing Sheets

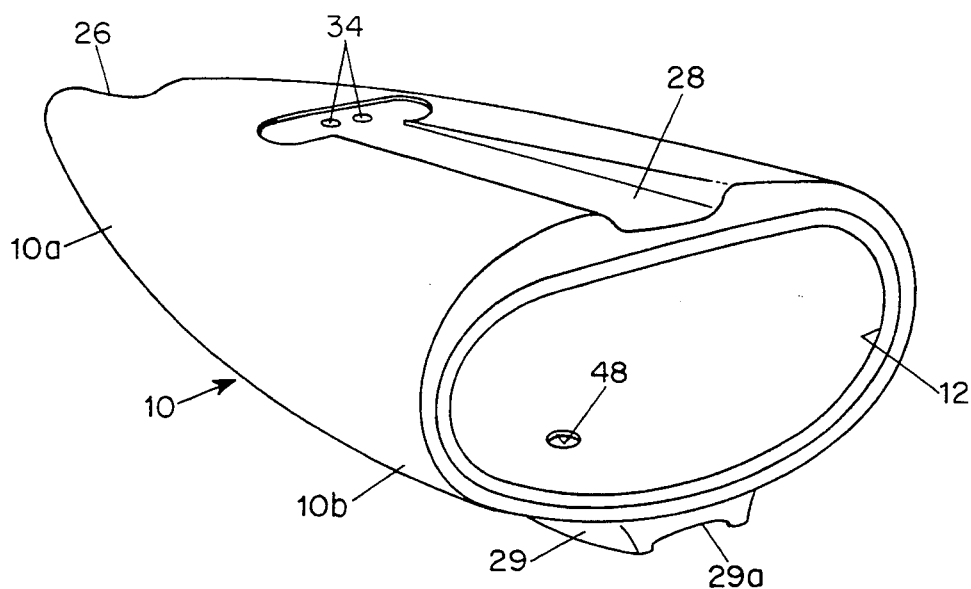
FIG. 8
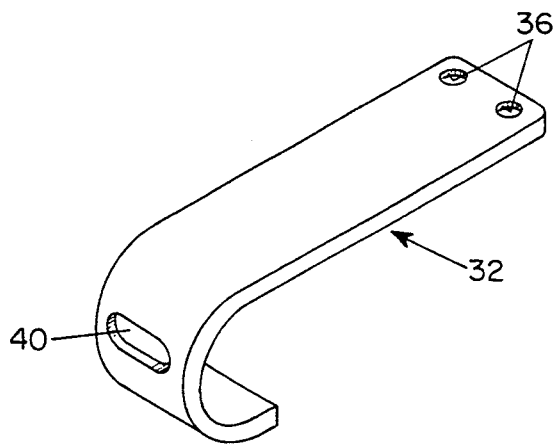
FIG. 9
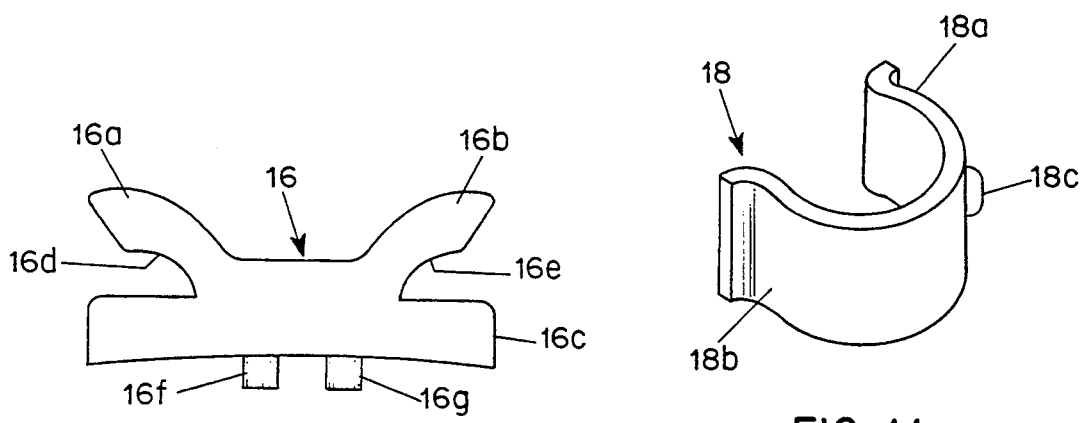
FIG. 10
FIG. 11

BICYCLE SEAT BAG

BACKGROUND OF THE INVENTION

One of the accessories most widely used by bicyclists is a seat bag. Seat bags are usually attached to the seat by two straps, each of which wraps around one of the seat frame bars and is fastened by a buckle or hook and loop cloth (Velcro ®), and a strap, also with a buckle or Velcro ®, that fastens the front end of the bag to the seat post. Recently, Cannondale Corporation introduced and is currently selling seat bags under the trademark "Seat Cleat TM" that have a cleat member on the top of the bag that defines with a support member to which the bag is attached a pair of slots that face laterally outward away from each other and slidably receive the seat frame bars.

To attach a "Seat Cleat TM" bag to the seat, the bag is inserted under the seat in a skewed orientation, pushed up so that the arms of the cleat member lie above the frame bars, and then rotated into the installed position, thereby bringing the frame bars into the slots. The "Seat Cleat TM" bags also have a C-shaped clip at the front end. The clip has a pair of resilient legs that engage the seat post with one leg of the clip on either side of the post. The cleat member supports the bag vertically, and the clip keeps the bag from turning and from sliding lengthwise, which could allow the cleat member to become disengaged. The "Seat Cleat TM" concept is disclosed in U.S. Pat. No. 5,127,563 (Chan et al. issued Jul. 7, 1992), which is owned by Cannondale and is incorporated herein by reference, and has the advantage of making it much easier to attach the bag to the seat and to detach it from the seat.

Heretofore, bicycle seat bags have usually been made from fabric. It is common to provide a stiffening insert, such as a sheet of semi-rigid polymeric film or foam, inside the fabric bag to impart shape to and enhance the load-carrying ability of the fabric bag. The manufacture of fabric bags is relatively labor-intensive, due to the need to stitch the bag from fabric components, attach a zipper or other closure, stitch the straps (when the bag has straps) and add other components, such as a reflector. Although fabric bags can be and usually are made of durable materials and last a long time, they are prone to soiling and to color-fading, so they eventually become somewhat unsightly. Water-repellant fabrics can be used, but fabric bags are not waterproof, and objects in the bag can become wet is the bag is left out in the rain or is placed on wet ground. Fabric bags provide relatively little protection to objects in the bag from impacts, particularly along the sides, and fragile articles in the bag can be damaged or broken by impacts to the bag.

SUMMARY OF THE INVENTION

One object of the present invention is to provide an improvement in a seat bag mounting system that uses the concept of the "Seat Cleat TM" bags but has a greater assurance that the bag will not detach from the seat. Another object is to provide a seat bag that is highly durable, completely waterproof, and easy to manufacture with low labor costs.

The first object is attained, in accordance with one aspect of the present invention, by a seat bag comprising a tapered body having a smaller forward end and a larger rearward end, an opening at the rearward end, a closure for the opening, and a cleat member on the top of the body having a pair of slots opening outwardly in opposite directions and adapted to receive frame bars of a bicycle seat to removably attach the body to the seat. The bag is kept from shifting forward or backward relative to the seat by a generally C-shaped clip member attached to the forward end of the body and having a pair of resilient legs defining an opening. Instead of facing forwardly, as in the "Seat Cleat TM" bags, the opening of the clip member faces laterally. The clip member is received on and resiliently engaged with the bicycle seat post with one leg in front of and the other leg in back of the seat post so as to attach the body to the seat post against forward and backward movement.

The laterally facing clip is less prone than the prior art forwardly facing clip from detaching from the seat post. An impact to the front of a bag can cause the front-facing prior art clip to release from the seat tube. The laterally facing clip of the bag of the present invention is highly resistant to detachment due to a frontal impact. A side impact to a bag with the laterally facing clip is resisted largely by the cleat, and the likelihood of a side impact causing detachment of the clip from the post is small.

According to another aspect of the invention, there is provided a seat bag comprising a tapered unitary body formed of a substantially rigid polymeric material and having a smaller forward end and a larger rearward end, an opening at the rearward end of the body, and a unitary cap member formed of a substantially rigid polymeric material and adapted to be detachably connected to the body at the opening. The above-described cleat member and laterally facing clip member are attached to the body and provide for attaching it to the bicycle seat.

In preferred embodiments of the invention, a backing plate is received within the body, and the cleat member and the clip member are attached to the backing plate, such as by chemical, adhesive or thermal bonding. The backing plate couples the cleat member and the clip member to each other to form a composite mounting structure for the bag. The backing plate provides increased strength and rigidity to the mounting structure for the body and enables the body to be made less strong and rigid for lower cost of manufacture and lower weight. One way of joining the cleat member and the clip member to the backup plate is to provide pins in the cleat member and clip member that pass through holes in the body and are received in recesses in the backing plate. The pins are thermally bonded to the backing plate at interengaging surfaces of the pins and the recesses that receive them.

The body is, preferably, formed by blow-molding. Blow-molding is an economical process of making relatively large articles of polymeric materials and in the present invention is a cost-saving feature.

The cap member may have an integral hinge portion that is connected to the body, such as by a pin on the hinge portion that is received in a hole in the bottom of the body and is retained in place by a snap fit or by being heat-staked within the body.

The production of the seat bag of the present invention from components made of polymeric materials, which are unitary and made by mass-production, greatly reduces the labor costs of manufacture. The materials are durable and can easily be cleaned. The bag is completely waterproof, which ensures that even under the worst of conditions articles in the bag will not get wet. The body, through not completely rigid, resists impacts and protects the articles in the bag from damage in the event of impacts to the bag. The mounting system is extremely easy to use—the bag can be attached to and detached from the seat with one hand.

For a better understanding of the invention, reference may be made to the following description of an exemplary embodiment, taken in conjunction with the accompanying drawings.

DESCRIPTION OF THE DRAWINGS

FIG. 8 is three-quarter rear pictorial view of the body of the bag, taken from above and from the left side;

FIG. 9 is three-quarter rear pictorial view of the backing plate, taken from above and from the left side;

FIG. 10 is a front elevational view of the cleat member; and

FIG. 11 is a pictorial view of the clip member.

DESCRIPTION OF THE EMBODIMENT

Figure 1:
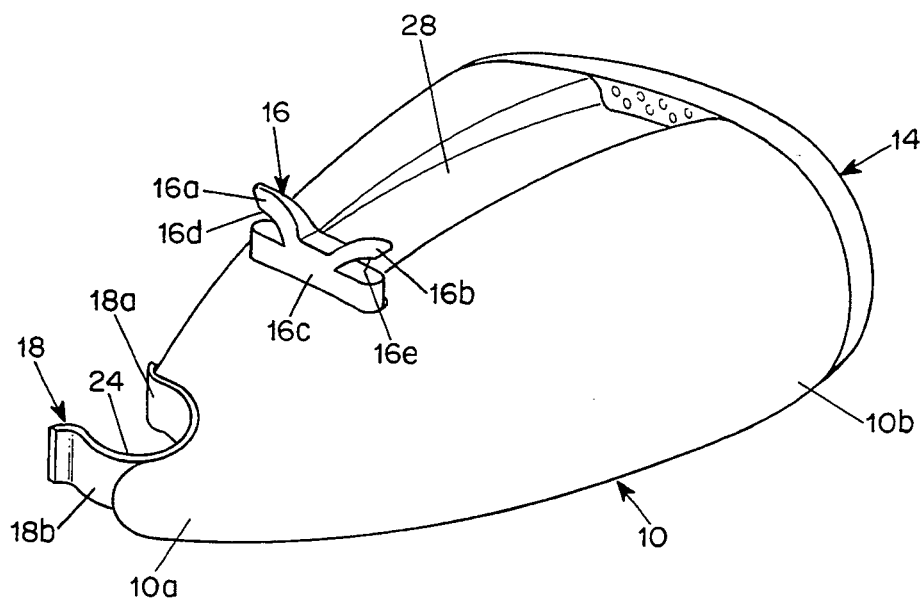
FIG. 1 is three-quarter front pictorial view of the embodiment taken from above and from the left side.
Figure 2:
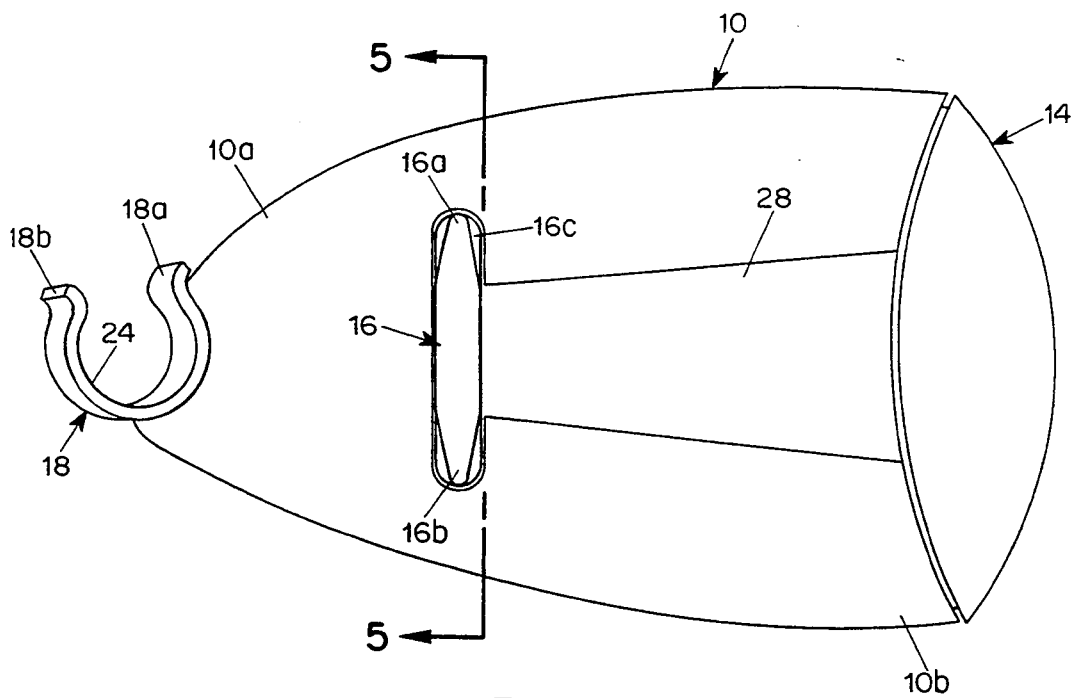
FIG. 2 is a top plan view.
Figure 3:
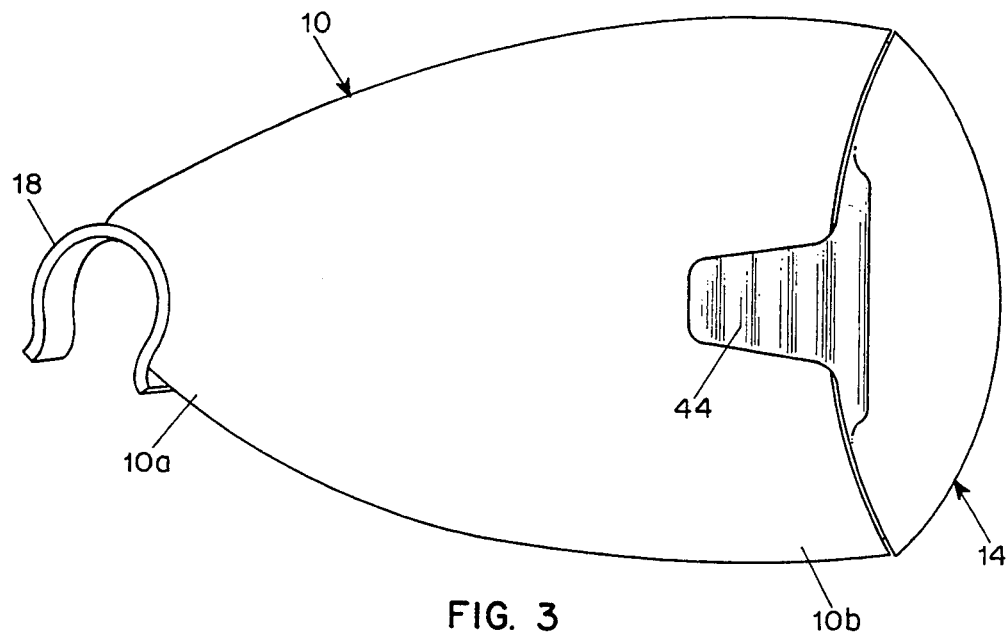
FIG. 3 is a bottom plan view.

The embodiment comprises a bulbous tapered body 10 having a smaller forward end 10a and a larger rearward end 10b, an opening 12 (see FIG. 8) at the rearward end, a closure 14 for the opening, a cleat member 16 on the top of the body and a generally C-shaped clip member 18 attached to the forward end of the body. The cleat member 16 has arm portions 16a, 16b that define with a base portion 16c a pair of slots 16d and 16e that open outwardly in opposite directions laterally of the body 10 and are adapted to receive frame bars of a bicycle seat to removably attach the body to the seat. The clip member 18 has a pair of resilient leg portions 18a, 18b that define an opening 24 that faces laterally. The clip member 18 is adapted to be received on and resiliently engaged with a bicycle seat post with one leg in front of and the other leg in back of the seat post so as to attach the body to the seat post against forward and backward movement and rotational movement about the cleat member.

One aspect of the invention, as described above, is the mounting system for the bag. The slots formed between the arms 16a and 16b and the base 16c of the cleat member 16 accept the frame bars of the bicycle seat, which is the main feature of the Chan et al. patent referred to above. In the mounting system of that patent, the opening of the clip that is attached to the seat post faces forwardly. In the present invention, the opening between the legs 18a and 18b of the clip 18 faces laterally. The present invention enhances the security of the attachment to the seat post. The mounting system of the present invention can be used with various forms of seat bags, including fabric bags.

According to another aspect of the present invention, the body 10 is a unitary component formed, preferably by blow-molding, from a suitable polymeric material.

Figure 6:
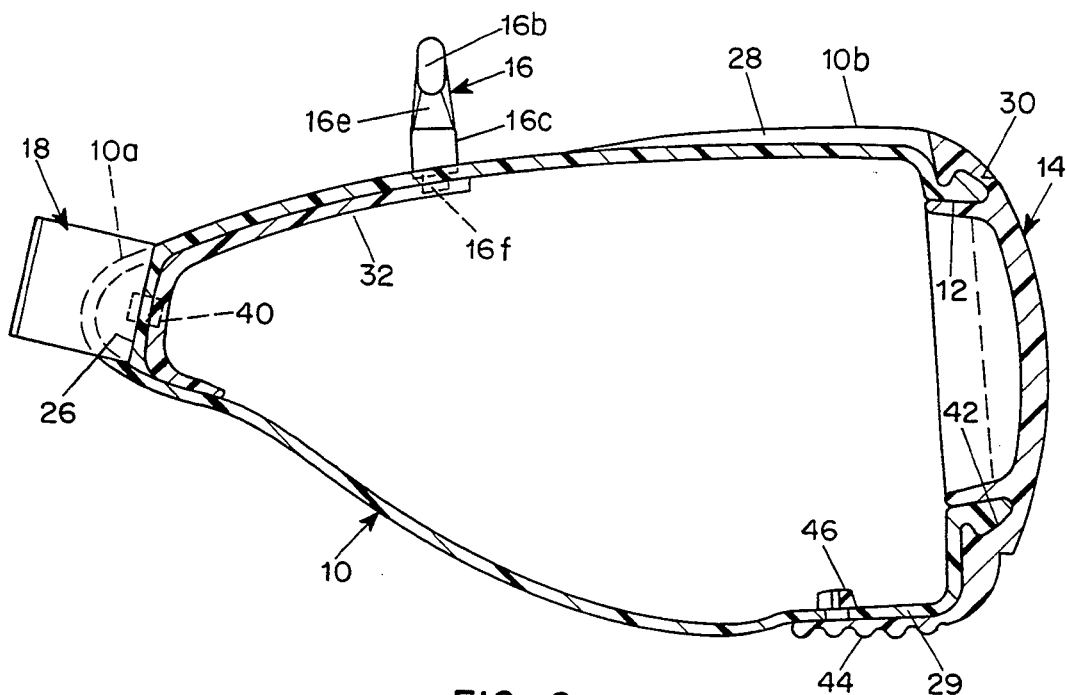
FIG. 6 is a side cross-sectional view taken along the vertical center plane.
Figure 7:
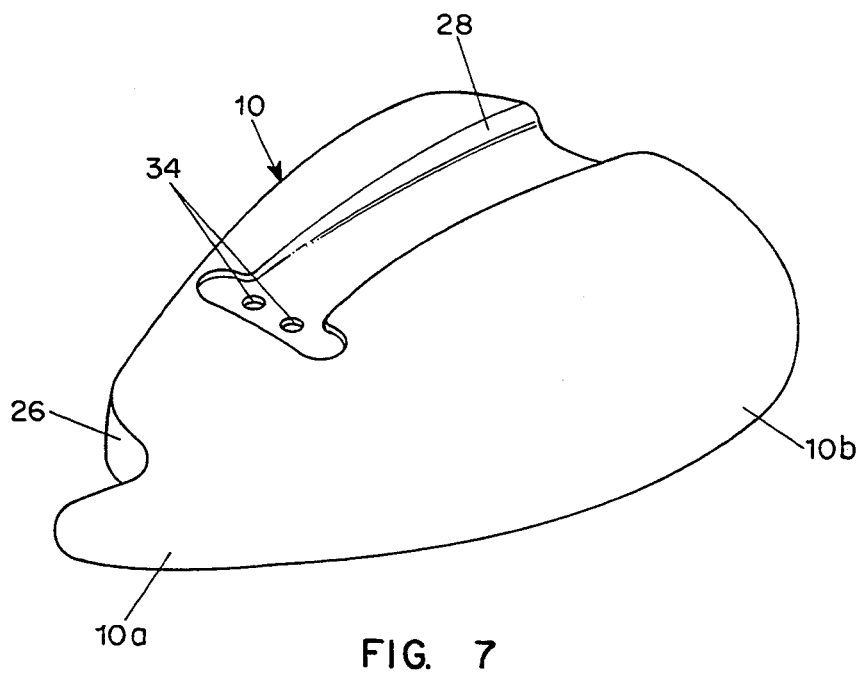
FIG. 7 is three-quarter front pictorial view of the body of the bag, taken from above and from the left side.

Referring to FIGS. 6 to 8, the closed front end 10a of the body is molded with a concavity 26, to which the clip is fitted (as described below), a recess 28 that extends from a location just to the rear of the clip to the rearward end 10b, and a projection 29 on the bottom that has a recess 29a. The opening 12 has a bead 30 that is formed to provide a snap-fit connection with the closure, as described below.

The cleat member 16 and clip member 18 are connected to each other and to the body 10 by a rigid backing plate 32, which is shown in FIG. 9. The backing plate is molded from a suitable polymeric material to a shape that conforms to a band along the interior of the top and front of the body (see FIG. 6). The cleat member 16 (FIG. 10) has a pair of pins 16f, 16g that pass through holes 34 in the body (FIGS. 7 and 8) and are received in recesses 36 in the backing plate. The surfaces of the pins 16f, 16g in engagement with the side and base walls of the recesses 36 are joined by fusion welding. Similarly, the clip member 18 (FIG. 11) has a laterally elongated pin 18c that passes through a hole 38 (FIG. 6) in the front of the body 10 and is received in a recess 40 in the backing plate. The pin 18c is fusion welded to the recess 40.

The backing plate 32 stiffens and strengthens the connection between the cleat member and clip member and permits the body 10 to be thinner and lighter, because it does not have to support as much of the load transferred between the mounting system and the bag. Nonetheless, it may be desirable to make the body thicker in the region of the backing plate for better reception and distribution of the loads transferred from the remaining part of the body.

Figure 4:
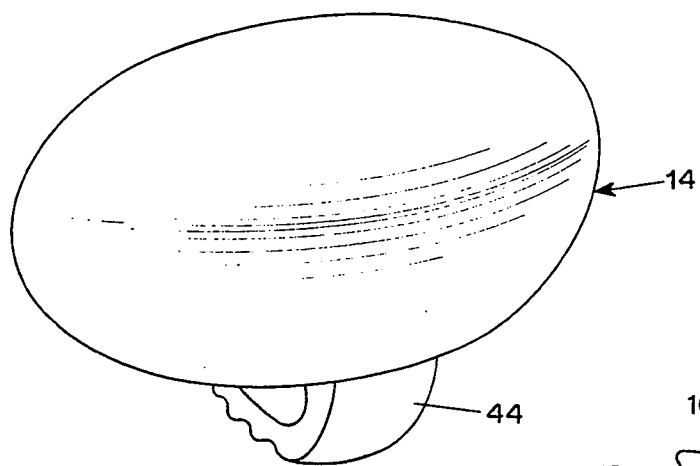
FIG. 4 is a three-quarter rear pictorial view of the closure member.
Figure 5:
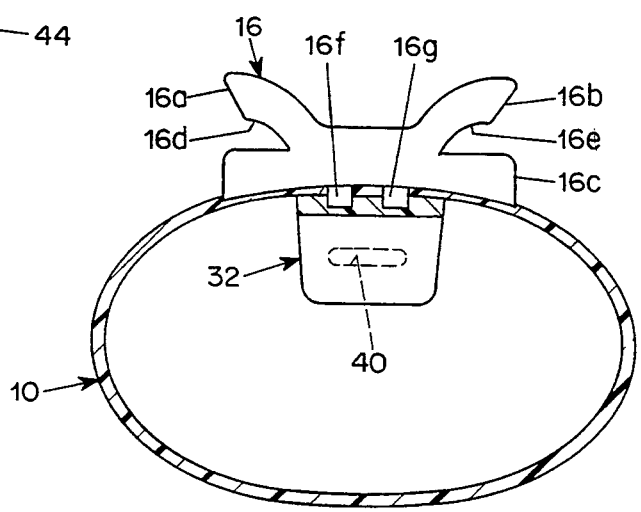
FIG. 5 is a rear cross-sectional view taken along the lines 5—5 of FIG. 2 and in the direction of the arrows.

The closure 14 (FIG. 4) is a member molded from a substantially rigid polymeric material. It is generally cup-shaped, presenting an outwardly convex surface and a rear profile matching the perimeter of the rearward end of the body. A recess 42 set into the inside face and extending around the closure adjacent its perimeter provides a snap-fit connection with the bead 30 around the opening 12 of the body 10 (see FIG. 6). A hinge portion 44 in the form of a strip molded integrally with the closure member is attached to the body by a pin 46 that passes through a hole 48 in the body and is heat-staked to form a retaining head on the inside. Alternatively, the pin can be a snap-in split pin with a head having retaining shoulders. The hinge portion is sufficiently flexible to permit it to bend and allow the body of the closure member to be displaced from the opening of the body for access to the inside of the body. As is apparent in FIG. 1, the recess 28 in the top of the body exposes a portion of the closure member to provide a finger grip for use in detaching the closure from the opening.

I claim:

1. A bicycle seat bag comprising a tapered body having a top portion, a smaller forward end and a larger rearward end, an opening at the rearward end, a closure for the opening, a cleat member on the top portion of the body having a pair of slots opening outwardly in opposite directions and adapted to receive frame bars of a bicycle seat to removably attach the body to the seat, a generally C-shaped clip member attached to the forward end of the body and having a pair of resilient legs defining an opening that faces laterally relative to the ends of the body, the clip member being adapted to be received on and resiliently engaged with a bicycle seat post with one leg in front of and the other leg in back of the seat post so as to attach the body to the seat post against forward, backward and rotational movements, and a backing plate received within the body, the cleat member and the clip member being attached to the backing plate, the backing plate thus coupling the cleat member and the clip member to each other and to the body.

2. A bicycle seat bag according to claim 1 wherein the cleat member, clip member and backing plate are molded from polymeric materials and are joined by bonding.

3. A bicycle seat bag according to claim 2 wherein the cleat member, clip member and backing plate are joined by thermal bonding.

4. A bicycle seat bag according to claim 1 wherein the body is a substantially rigid unitary member formed from a polymeric material.

5. A bicycle seat bag according to claim 4 wherein the body is formed by blow-molding.

6. A bicycle seat bag according to claim 4 wherein the closure is a unitary substantially rigid cap member formed of a polymeric material.

7. A bicycle seat bag according to claim 6 wherein the body and the cap member have interengaging means for releasably connecting the cap member to the body at the opening in the body.

8. A bicycle seat bag according to claim 7 wherein the cap member has an integral hinge portion and the hinge portion is connected to the body.

9. A bicycle seat bag comprising a tapered unitary body formed of a substantially rigid polymeric material and having a top portion, a smaller forward end and a larger rearward end, an opening at the rearward end of the body, a unitary cap member formed of a substantially rigid polymeric material, means for detachably connecting the cap member to the body at the opening, a cleat member on the top portion of the body having a pair of slots opening outwardly in opposite directions and adapted to receive frame bars of a bicycle seat to removably attach the body to the seat, and a generally C-shaped clip member attached to the forward end of the body and having a pair of resilient legs defining an opening, the clip member being adapted to be received on and resiliently engaged with a bicycle seat post so as to attach the body to the seat post against forward, backward and rotational movements.

10. A bicycle seat bag according to claim 9 and further comprising a backing plate received within the body and wherein the cleat member and the clip member are attached to the backing plate and the backing plate couples the cleat member and the clip member to each other.

11. A bicycle seat bag according to claim 10 wherein the cleat member, clip member and backing plate are molded from polymeric materials and are joined by bonding.

12. A bicycle seat bag according to claim 11 wherein the cleat member, clip member and backing plate are joined by thermal bonding.

13. A bicycle seat bag according to claim 12 wherein the cleat member and the clip member have pins that pass through holes in the body and are received in recesses in the backing plate and the pins are thermally bonded to the coupling member at interengaging surfaces of the pins and the recesses that receive them.

14. A bicycle seat bag according to claim 9 wherein the body is formed by blow-molding.

15. A bicycle seat bag according to claim 9 wherein the cap member has an integral hinge portion and the hinge portion is connected to the body.

16. A bicycle seat bag according to claim 15 wherein the hinge portion of the cap member has a pin that is received in a hole in the bottom of the body to attach the cap to the body and the pin has a head portion within the body.

17. A bicycle seat bag according to claim 9 wherein the legs of the clip member face generally laterally with respect to the ends of the body and are adapted to be received on and resiliently engaged with a bicycle seat post with one leg in front of and the other leg in back of the seat post.

* * * * *